United States Patent
Häfele et al.

(10) Patent No.: US 11,974,891 B2
(45) Date of Patent: May 7, 2024

(54) METHOD FOR PRODUCING A DENTAL PROSTHESIS, BLANK AND DENTAL PROSTHESIS

(71) Applicant: Ivoclar Vivadent AG, Schaan (LI)

(72) Inventors: Clemens Andreas Häfele, Feldkirch (AT); Roger Frei, Heerbrugg (CH); Konrad Hagenbuch, Haag (CH); Markus Geier, Tisens (IT); Frank Frenzel, Widnau (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 17/380,098

(22) Filed: Jul. 20, 2021

(65) Prior Publication Data

US 2022/0061966 A1 Mar. 3, 2022

(30) Foreign Application Priority Data

Sep. 2, 2020 (EP) ..................... 20194147

(51) Int. Cl.
*G05B 19/4099* (2006.01)
*A61C 8/00* (2006.01)
(Continued)

(52) U.S. Cl.
CPC ........ *A61C 13/0004* (2013.01); *A61C 8/0012* (2013.01); *A61C 8/0018* (2013.01);
(Continued)

(58) Field of Classification Search
CPC . A61C 13/0004; A61C 13/01; A61C 13/0006; A61C 13/082; A61C 13/09; A61C 13/10; A61C 13/1003
See application file for complete search history.

(56) References Cited

U.S. PATENT DOCUMENTS 6,832,877 B2 12/2004 Hamada
8,545,222 B2 * 10/2013 Wang ................. A61C 13/0003
433/173

(Continued)

FOREIGN PATENT DOCUMENTS

DE 837288 4/1952
DE 2021194 A1 11/1971
(Continued)

OTHER PUBLICATIONS

Japanese Patent Office Action; Notice of Reasons for Refusal; Jan. 15, 2024.

*Primary Examiner* — Jacob J Cigna
(74) *Attorney, Agent, or Firm* — Ann M. Knab; Thad McMurray

(57) ABSTRACT

A method is provided for producing a dental prosthesis from a blank using a CAD/CAM device, wherein the blank consists partially of base material and partially of tooth material, and a boundary surface between these materials is formed as a wave, the wave crests and wave valleys of which alternate with each other along the outer periphery of the blank. The apex of each wave crest extends substantially radially with respect to the blank. The CAD/CAM device fixes the position of a retention part, which serves to fasten the prosthesis to the alveolar crest of a patient, in particular of an external telescope, of a cover of a bar, or of an abutment in the prosthesis in such a way that it passes through the boundary surface. The retention part is fastened by means of gluing or incorporation by polymerisation.

3 Claims, 4 Drawing Sheets

(51) Int. Cl.
  *A61C 13/00* (2006.01)
  *A61C 13/01* (2006.01)
  *A61C 13/08* (2006.01)
  *A61C 13/10* (2006.01)
  *A61C 13/277* (2006.01)

(52) U.S. Cl.
  CPC ........ *A61C 8/0093* (2013.01); *A61C 13/0022* (2013.01); *A61C 13/01* (2013.01); *A61C 13/08* (2013.01); *A61C 13/10* (2013.01); *A61C 13/277* (2013.01); *G05B 19/4099* (2013.01); *G05B 2219/45167* (2013.01)

(56) References Cited

U.S. PATENT DOCUMENTS

| | | |
|---|---|---|
| 8,678,822 B2 | 3/2014 | Seo |
| 9,707,061 B2 * | 7/2017 | Morales .................. A61C 13/34 |
| 9,801,699 B2 * | 10/2017 | Okay .................... A61C 9/0053 |
| 9,855,120 B2 | 1/2018 | Seo |
| 10,231,806 B2 * | 3/2019 | Chou .................... A61C 9/0006 |
| 10,543,088 B2 | 1/2020 | Stobbe |
| 10,617,497 B2 | 4/2020 | Lopez |
| 10,646,311 B2 | 5/2020 | Watzke et al. |
| 10,799,916 B2 | 10/2020 | Shaw et al. |
| 2003/0123943 A1 | 7/2003 | Hamada |
| 2006/0199154 A1 * | 9/2006 | Kraemer ............ A61C 13/0004 433/223 |
| 2007/0020582 A1 | 1/2007 | Neumeyer |
| 2007/0111163 A1 | 5/2007 | Powell |
| 2010/0248186 A1 | 9/2010 | Van Werkhoven |
| 2013/0101962 A1 | 4/2013 | Howe |
| 2018/0071063 A1 * | 3/2018 | Watzke .................. A61C 13/00 |
| 2018/0280123 A1 | 10/2018 | Aravena |
| 2020/0015944 A1 | 1/2020 | Geier et al. |
| 2020/0015947 A1 | 1/2020 | Geier et al. |
| 2020/0060794 A1 * | 2/2020 | Pappas ................. A61C 8/0048 |
| 2022/0096210 A1 * | 3/2022 | Medgaus ............. A61C 8/0075 |

FOREIGN PATENT DOCUMENTS

| | | |
|---|---|---|
| DE | 102005031249 A1 | 4/2007 |
| JP | 2005168518 A | 6/2005 |
| JP | 2016518170 A | 6/2016 |

\* cited by examiner

METHOD FOR PRODUCING A DENTAL PROSTHESIS, BLANK AND DENTAL PROSTHESIS

CROSS-REFERENCE TO RELATED APPLICATIONS

This application claims priority to European patent application No. 20194147.3 filed on Sep. 2, 2020, the disclosure of which is incorporated herein by reference in its entirety.

TECHNICAL FIELD

The present invention relates to a method for producing a dental prosthesis from a blank, to a blank for producing a dental prosthesis, and to a dental prosthesis.

BACKGROUND

When producing dental prostheses, attention is typically given to selecting the shaping of the dental prosthesis in such a way that the patient experiences the least possible sense of disturbance. The patient should be able to speak, swallow and chew as if they still had their natural teeth.

For such a dental prosthesis, on the one hand, good material tolerance and, on the other hand, the slender design of the prosthesis are desirable.

In order to ensure secure anchoring of the teeth in the dental prosthesis, these teeth are typically glued in or are even introduced in an injection moulding process.

A solution relating to this is found in DE 837288 B1.

This solution has not become established since it required complicated shaping of the teeth and special injection moulding tools with sliders had to be used for the injection moulding, which were expensive to produce in particular when tools had to be provided for different tooth shapes.

In order to provide an intimate connection between the teeth and prosthesis base, it has also become known to resort to the hot-polymerisation method. An example of this is the solution known from DE 2021194 A1.

Such solutions are currently not particularly widely used especially since hot-polymerised prostheses clearly tend to break comparatively easily.

The production of prostheses from metal-synthetic material constructions with improved stability has long been known.

In the case of implant-supported prostheses, e.g. bars have become known which are anchored to the implants and form the mounting for so-called covers which are connected to the prosthesis base material.

Such prostheses are particularly stable in the region of the cover. Typically, the covers terminate at points at which the bars also terminate.

Prostheses are particularly prone to breaking at these points.

Furthermore, prostheses with other metal frameworks have also become known, including those with attachments, metal anchors and telescopes.

Such solutions usually extend along the tooth quadrant of the prosthesis, wherein the metal framework is surrounded by prosthesis material.

Although such prostheses are typically comparatively stable, they are heavy and thicker and so they often feel unpleasant to the patient.

SUMMARY

In contrast, it is the object of the invention to provide a method for producing a dental prosthesis from a blank according to the claims, a blank for producing a dental prosthesis according to the claims, and a dental prosthesis according to the claims, which permits long-term durability while being comparatively very favourable to produce and being acceptable and compatible with the mouth.

In accordance with the invention, this object is achieved by the independent claims. Advantageous developments are apparent from the dependent claims.

In accordance with the invention, provision is made for producing a dental prosthesis which is made from a special blank. The blank comprises tooth material and base material which are connected to each other in a wave shape. The wave of the wave shape extends along the outer periphery of the tooth quadrant and/or of the blank. Examples of blanks with a wave shape are found in U.S. Pat. No. 10,646,311, 20200015947 and 20200015944, which are hereby incorporated by reference in their entirety.

Such a blank, from which a prosthesis is produced by means of a machining method e.g. by milling, unexpectedly provides improved basic stability and rigidity. The wave-shaped red/white transition clearly provides particularly good dimensional stability. The tooth material and the base material are attached to each other by polymerisation along the boundary surface which is likewise formed in a wave-shaped or scalloped manner.

In an advantageous embodiment, the base material is provided, in accordance with the invention, with apertures into which retainers can be inserted. The retainers serve to mount and fasten the prosthesis, e.g. to implants or even to abutment teeth or stumps.

It is particularly favourable for the apertures to pass through the boundary surface. The retainers then extend into the tooth material. The retainers are securely anchored at that location. This anchoring is provided in addition to the anchoring in the base material.

In accordance with the invention, it is favourable that there is no third layer between the two material layers, i.e. tooth material and base material. This would conventionally be a layer of adhesive but this is avoided in accordance with the invention.

It is rather the case that the two materials are attached to each other by polymerisation under the effect of pressure and heat and so direct chemical bonding of the two materials takes place. This favours the reduction of force spikes.

Dispensing with this transition layer in conjunction with the three-dimensional structure of the boundary surface unexpectedly leads to improved durability and strength.

Polymethyl methacrylate (PMMA) is preferred for both materials, for the tooth material in particular, is preferably a double crosslinked (DCL) material.

It is particularly favourable in accordance with the invention for the aperture to pass through the boundary surface in an inclined manner. Both tooth material and also base material is then typically present at the boundary surface. At one point, the base material then extends radially outside the tooth material in relation to the aperture and the retainer. The minimum wall thickness for secure mounting of the locator or of the retainer in the prosthesis base can then be maintained even if e.g. the tooth material alone or the base material alone did not reach this.

While, in the case of conventional dental prostheses, material would then be applied in order to maintain the minimum wall thickness of e.g. 2 mm, this is not required in accordance with the invention.

By reason of the connecting length, which is comparatively long in the direction towards the gums/occlusal direction, between the retainer and the aperture, a comparatively low material loading is produced in the prosthesis material and also a low surface pressure on the prosthesis material owing to chewing forces. This is favourable to a long life, in particular also in conjunction with the non-application of changes in rigidity by metal frameworks extending medially/distally.

The retainer is fastened, preferably glued, in the respectively associated aperture. However, it can be incorporated by polymerisation, or otherwise fastened, at this location, e.g. it can be screwed in. The aperture is open towards the gums and closed in the occlusal direction in the manner of a blind hole.

In accordance with the invention, stability is also favoured by the fact that the tooth material forms a single-piece tooth quadrant. This has considerably greater inherent stability than single teeth. This stability is favourable in terms of preventing breakage.

In accordance with the invention, the position and arrangement of the apertures for the locators or retainers is initially established in the CAD procedure. In this case, the minimum wall thickness can be fixed as a boundary condition, possibly from the combination of the tooth material with the base material.

The strength and suitability of the jawbone at the relevant location where the implant is placed can possibly also be included in the considerations and calculations relating to strength. It is also possible to optimise in advance the position of the implant in the vestibular-oral direction, which is favourable to long-term durability of the implant and therefore ultimately of the prosthesis.

The invention is not limited to fixed or releasable prostheses. The manner of the mounting, i.e. implant-supported, stump-supported or hybrid prostheses, is not fixed in accordance with the invention; rather, the invention is applicable to all types of prostheses.

A modified embodiment makes provision for zirconium oxide to be selected as the tooth material.

Alternatively, the whole blank can also be produced from tooth material and base material using zirconium dioxide.

Zirconium dioxide has a considerable level of abrasion resistance and is therefore particularly suitable for producing teeth. It can also be produced as a tooth quadrant or partial tooth quadrant.

In particular, such a tooth quadrant made from zirconium dioxide contributes considerably to the stiffening of the prosthesis. It is particularly favourable because, in the case of implant-supported restorations, the chewing loading is greater in comparison with natural teeth.

In an advantageous embodiment of the invention, provision is made that the base material and the tooth material consist of, or comprise, zirconium dioxide, and that the retention part(s) is/are mounted in at least one aperture in the blank/finished prosthesis, in particular is/are glued in.

In an advantageous embodiment of the invention, provision is made that the tooth material also at least partially consists of highly cross-linked PMMA, in particular of DCL material, and the base material consists of comparatively less highly cross-linked PMMA attached thereto by polymerisation.

In a preferred embodiment, a method for producing a dental prosthesis from a blank using a CAD/CAM device is provided, wherein the blank includes a base material and a tooth material having a boundary surface between the base material and the tooth material, which boundary surface is formed as a wave having wave crests and wave valleys which alternate with each other along an outer periphery of the blank, wherein a peak of each wave crest extends substantially radially with respect to the blank, the method includes determining a position of a retention part, which retention part serves to fasten the prosthesis to an alveolar crest of a patient in such a way that it passes through the boundary surface, fastening the retention part by gluing, screwing or incorporation by polymerisation. The position of the retention part is determined by the CAD/CAM device. Preferably, the retention part comprises an external telescope fitting or an overlay or covering of a bar or of an abutment in the prosthesis.

It is preferable that the CAD/CAM device uses a minimum wall thickness of the prosthesis around the retention part as a parameter for determining the position of the retention part in the prosthesis, and uses the sum total wall thickness of the base material and tooth material as a measure for the wall thickness.

In a preferred embodiment, a blank for producing a dental prosthesis is provided, the blank including a base material and a tooth material, wherein the base material and tooth material are connected to each other with a boundary surface between the base material and the tooth material, wherein the boundary surface is formed as a wave comprising wave crests and wave valleys which wave crests and wave valleys alternate with each other along an outer periphery of the blank in a substantially sinusoidally or in a substantially catenary form, wherein a peak of each wave crest extends substantially radially with respect to the disc, wherein at least two apertures are formed in the base material and/or in the tooth material, in or on which a retention part is introduced and fastened.

In a preferred embodiment, the base material and/or the tooth material of the blank are fabricated of zirconium dioxide and the retention part(s) is/are mounted in and bonded to at least one aperture in the blank. At least one aperture passes through the base material, and the retention part lies on or in the tooth material or is held thereon. The retention part extends from the aperture towards the gums and is surrounded thereby in the oral, vestibular and occlusal directions. The retention part includes a roughened outer surface, grooves, a three-dimensional structure, orifices, protrusions and/or depressions.

In a preferred embodiment, a dental prosthesis is provided having a prosthesis base and a tooth arrangement, which is produced from a disc-like blank which has a base material and a tooth material, between which base and tooth materials a boundary surface exists which is formed as a wave, the wave crests and wave valleys of which alternate with each other along the outer periphery of the dental prosthesis and/or the disc, wherein each peak of a wave crest extends substantially radially with respect to the disc, wherein at least two apertures are provided in the base material of the disc, in which or on which retention parts are held in each of the at least two apertures. The retention parts are held in each of the at least two apertures by an adhesive or cement. At least one of the two retention parts is a cover of a bar, by which the dental prosthesis is removable and insertable into a patient's mouth and fastened in the patient's mouth. At least one retention part is an external telescope which can be connected to an internal telescope, or is a locator by the dental prosthesis is removable and insertable into a patient's mouth and and fastened in the patient's mouth. At least one of the at least two apertures is formed on each side of a sagittal plane of the dental prosthesis.

It is preferable that, adjacent to a distal end of the dental prosthesis, the base material forms bearing surfaces, the surface normals of which point towards the gums, which are intended to attach to a patient's alveolar crest.

It is preferable that 2 to 4 apertures are formed, distributed over the course of a tooth quadrant of the dental prosthesis, which each receive a retention part.

It is preferable that the tooth material has direct contact with the retention part and the aperture passes through the base material, and/or the retention part has contact both with the base material and also with the tooth material, and the aperture passes through the base material in each case. The tooth material includes teeth connected to each other at least partially as one piece, forming a tooth quadrant or partial tooth quadrant.

BRIEF DESCRIPTION OF THE DRAWINGS

Further advantages and details of the invention are described in more detail in the following description of Figures with reference to the drawing.

In the drawings.

DETAILED DESCRIPTION

Figure 1:
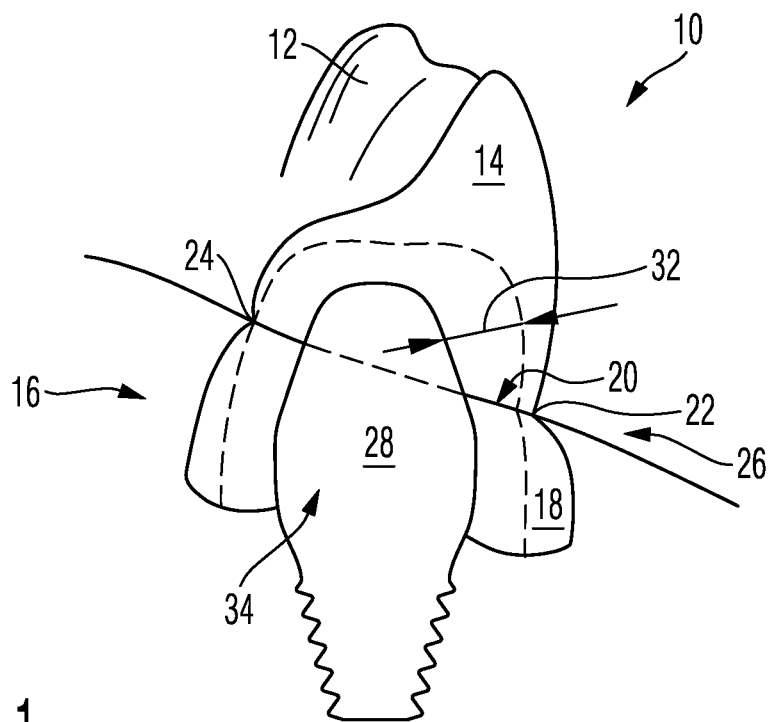
FIG. 1 shows a schematic cross-sectional view in the oral/vestibular direction through a part of one embodiment of a dental prosthesis produced in accordance with the invention.

FIG. 1 schematically shows a cross-sectional view through a dental prosthesis 10 in accordance with the invention, the tooth quadrant 12 being formed from tooth material 14 and a prosthesis base 16 being formed from base material 18. These are attached to each other by polymerisation at a boundary surface 20.

The dental prosthesis 10 is produced from a blank which is e.g. disc-shaped. The boundary surface 20 extends in an undulating manner therein with a wave extending along the outer periphery. In relation to the design thereof and to the blank, reference is made to EP 3 064 170 A2 and corresponding U.S. Pat. No. 10,646,311B2, US 20200015947 and US 20200015944, which are hereby incorporated by reference in their entirety.

Figure 2:
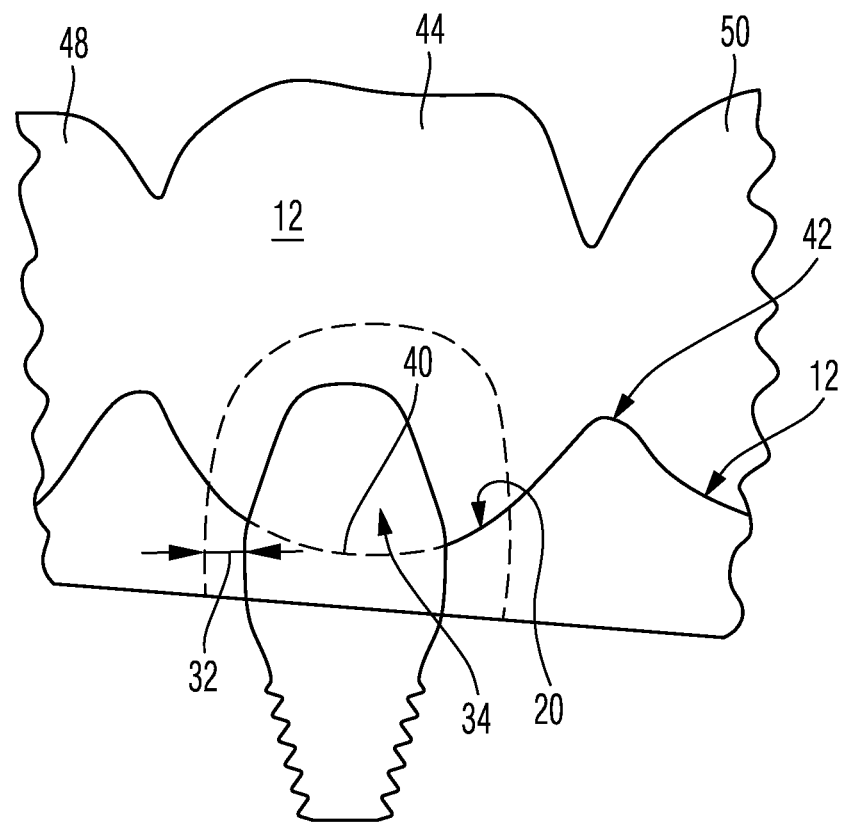
FIG. 2 shows a schematic cross-sectional view in the distal/mesial direction through a part of one embodiment of a dental prosthesis produced in accordance with the invention.

The wave of the boundary surface 20 comprises—viewed along its outer periphery corresponding to the gingival edge—alternating wave valleys and wave crests and preferably extends in the manner of a catenary curve as shown in FIG. 2. As viewed in the vestibular-oral direction, it extends radiantly, i.e. in the vestibular direction, spreading radially outwards.

In FIG. 1 the boundary surface extends straight as viewed in the radial direction.

Figure 4A:
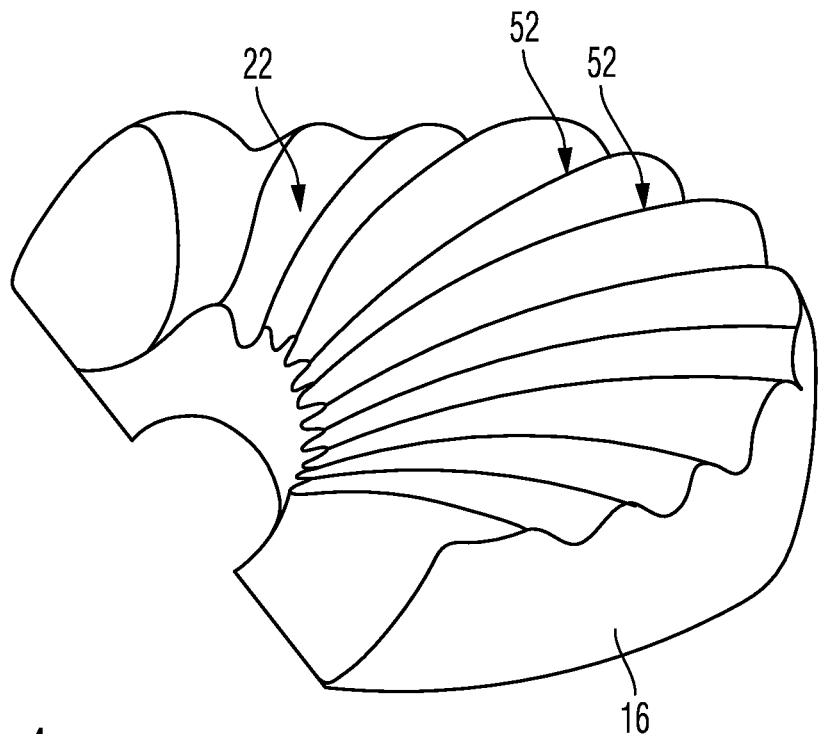
FIG. 4a shows a schematic perspective view of a modified embodiment of the dental prosthesis produced in accordance with the invention, drawing attention to the illustration of the boundary surface and leaving out the tooth material.

However, according to a modified embodiment it is also possible to have the boundary surface extending in a curve in the radial direction, c.f. FIG. 4a. In this case, the wave crests and wave valleys spread radially outwards but do not extend radiantly but rather are three-dimensional in structure.

As shown in FIG. 1, there are constrictions 22 and 24 in both the oral and also vestibular directions at the transition between the materials 14 and 18. These form the gingival edge 26 at the location of the material transition between the two materials 14 and 18, which are preferably attached to each other by polymerisation.

At the location shown in FIG. 1, the prosthesis 10 is supported by a retention part 28.

For the sake of simplicity, this is shown in the Figures as one piece with the associated implant screw and an internal telescope. In practice, 3 parts are generally present in this respect. A telescope, but also e.g. a locator, a ball anchor, a conical crown or any other retention part can be used as the retention part 28. US 20100248186, 20070111163, 20070020582, 20030123943, U.S. Pat. No. 10,543,068, 10,617,497, 9,855,120, 8,678,822, and 6,832,877, each disclose an example of a retention means and are hereby incorporated by reference in their entirety. Other examples of implant overdentures attachment systems having two parts include the matrix being the receptacle component, and a corresponding patrix that fits closely within the matrix, either mechanically, or with a friction fit. One part of the attachment system is usually connected to the implant and the other incorporated within the undersurface of the overdenture. The patrix designs take the form of a connecting bar/s or free-standing ball/magnetic abutments. The matrix designs are adjustable and/or replaceable, are mechanical, friction fit or magnetic, and usually take the form of clips for bars; metal lamellae; plastic/nylon caps springs, or rubber O-rings for ball abutments; keepers or retainers for magnetic abutments. The range of available attachment systems permits dentists and dental technicians to select a retentive mechanism that reflects personal experience and preference, plus necessary patient considerations.

The retention part 28 is incorporated by polymerisation into the prosthesis 10. It passes through the boundary surface 20.

During development of the prosthesis 10 using a CAD/CAM device 30, the boundary surface 20 is present virtually. Furthermore, a minimum wall thickness 32 is set in a material-dependent manner. For the sake of clarity, this is shown in the Figures although in fact it is present only in the CAD/CAM device 30. According to FIG. 1 the design is such that the minimum wall thickness 32 extends both in the tooth material 14 and also in the base material 18 and in neither case is it less than the minimum. By reason of the attachment by polymerisation and the wave shape the materials 14 and 18 strengthen each other so that it is also sufficient for the stability of the prosthesis 10 if the minimum wall thickness 32 is partially maintained precisely like this, in this case at the constriction 24.

By means of the present one-piece blank with its internal wave geometry it is possible to compensate for a relatively small wall thickness of the base material or of the tooth material with the aid of the other material region in order still to achieve the required minimum wall thicknesses.

Compared to a two-piece prosthesis which is produced by milling/pressing a separate prosthesis base and a separate tooth quadrant, in accordance with the invention no separate consideration of the stability of the individual parts/systems is required. Computation time is thus reduced and adaptations during CAD can be accelerated while still ensuring the secure stability of the prosthesis.

At least 2 retention parts 28 are provided over the course of the dental prosthesis 10. These are received in a respective aperture 34 which extends in an open manner towards the gums and passes through the boundary surface 20.

The apertures 34 are each preferably provided below the rear premolars when there are two of them. In a manner which is known per se, a spoon-like gum overlay is formed which serves as further support.

The precise position and orientation of the retention parts 28 or of corresponding abutments can be adapted to the requirements within broad ranges.

According to FIG. 2 provision is made so that the aperture 34 is produced in a wave valley 40. At this location, the tooth material 14 extends a particularly long way towards the gums so that the anchoring is particularly good and stable at that point if DCL material is used for this purpose.

The premolar 44 over the aperture 34 and the retention part 28 is part of the tooth quadrant 12 to which at least its adjoining teeth 48 and 50 also belong.

Figure 3:
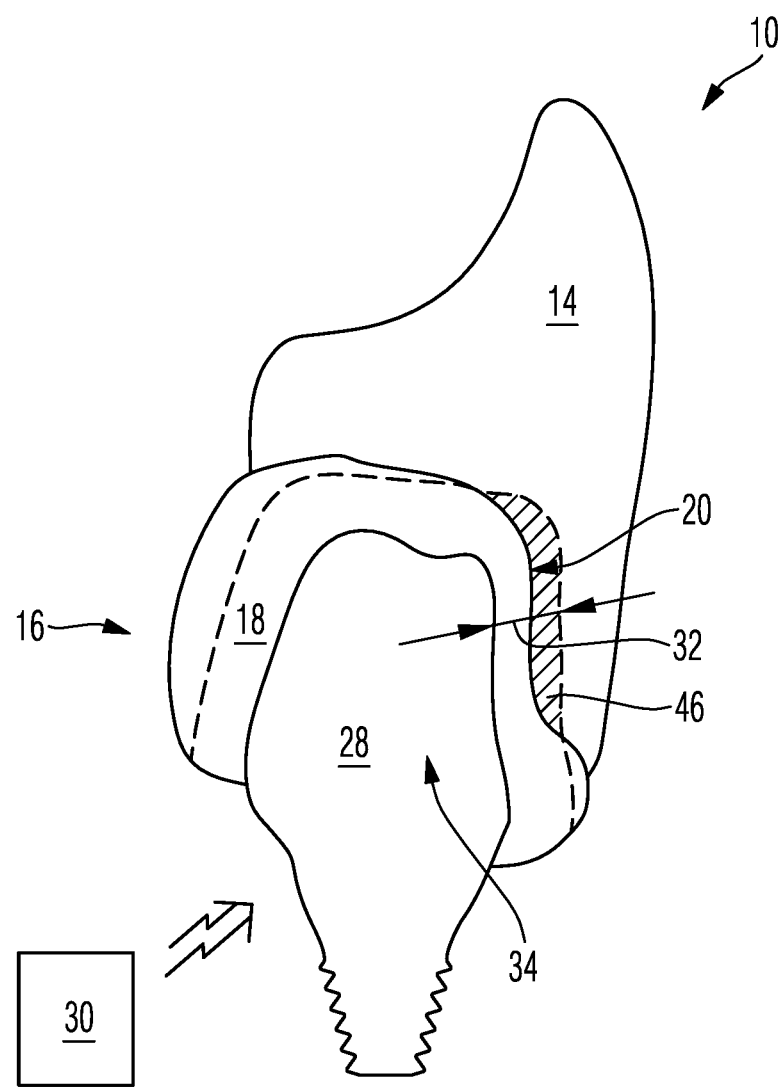
FIG. 3 shows a schematic cross-sectional view in the oral/vestibular direction through a part of an exemplified dental prosthesis.

According to FIG. 3, added by way of example, the hatched area 46 shows that at that location, the minimum wall thickness 32 through the base material 18 alone would not be maintained arithmetically. However, at that location, the tooth material 14 is provided outside the base material and supports it sufficiently.

FIG. 4*a* shows the course of the boundary surface 22 in a modified embodiment of the invention.

In the oral-vestibular direction, the boundary surface 22 extends in a curved manner, and in a wave shape when viewed along the outer periphery of the prosthesis base 16.

The curvature is preferably selected in such a way that the course of the wave crests 52 approaches the horizontal in the radially outwards direction, and diverges more strongly from the horizontal in the radially inwards direction.

When a smaller prosthesis is to be produced, then, in this case also, a substantially horizontal wave crest 52 is also present on the outside. Nevertheless, more economical base material 18 and a less expensive DCL material can be used in the blank.

In aesthetically more demanding combinations, it is favourable if the boundary surface on the vestibular gingival edge 26—in the case of the lower jaw—comes to lie somewhat below the oral gingival edge 24. This is particularly true for older patients with gum shrinkage.

Figure 4B:
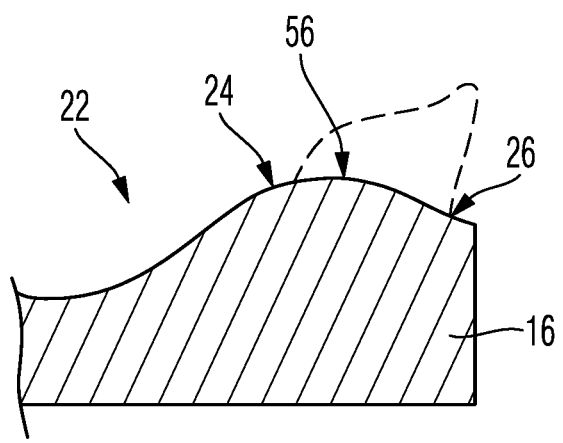
FIG. 4b shows a cross-sectional view in the oral-vestibular direction through the prosthesis base in the embodiment of FIG. 4a but with a modified line of curvature of the wave crest.

This form of the boundary surface can be taken into account in that, according to FIG. 4*b*, the apex 56 of the wave crest 52 is shifted radially inwards, i.e. to the left in FIG. 4*b*. A horizontal S-shape of the boundary surface extension on the wave crest 52 according to 4*b* can also be provided.

It will be understood that in the embodiments of FIGS. 4*a* and 4*b*, the wave valleys follow the wave crests 52. The wave amplitude, as viewed in the peripheral direction, thus remains substantially uniform.

Alternatively, it is also possible to make this amplitude lower in the radially inwards direction and higher in the radially outwards direction, corresponding to the human gingival edge amplitude.

With this solution, an automatic adaptation to natural properties can also be ensured since, in the case of a smaller prosthesis, a smaller vestibular-gingival edge amplitude has a more harmonious effect.

Figure 5:
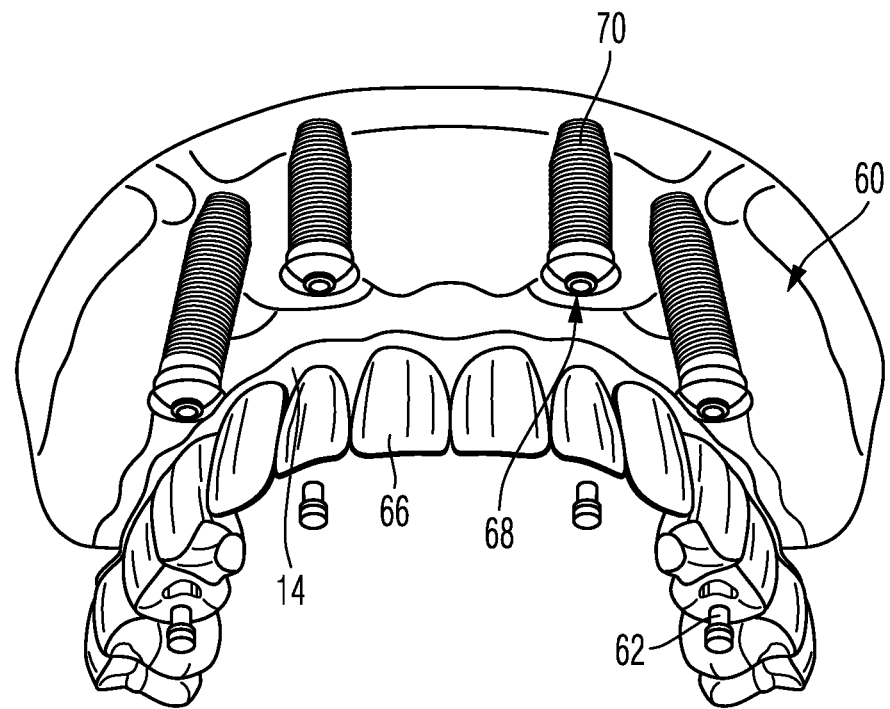
FIG. 5 shows a schematic perspective view of a further embodiment of the dental prosthesis produced in accordance with the invention.

FIG. 5 shows a further exemplified embodiment of the invention. A screw arrangement 60 with screws 62 is provided. A tooth quadrant 66 is provided. Each screw 62 passes through the tooth quadrant 66 and the prosthesis base 16 and is in threaded engagement with an internal thread 68 in an implant body 70 anchored in the patient's jaw. The screws 62 therefore serve to fasten the prosthesis to the patient's jaw.

This is a multi-unit system. Alternatively, it is also possible for the screw to engage or be fastened directly in the implant or abutment.

In this case, the implant interface geometry could also be established on the basal side so that the screw is provided as a single fastening element.

Figure 6:
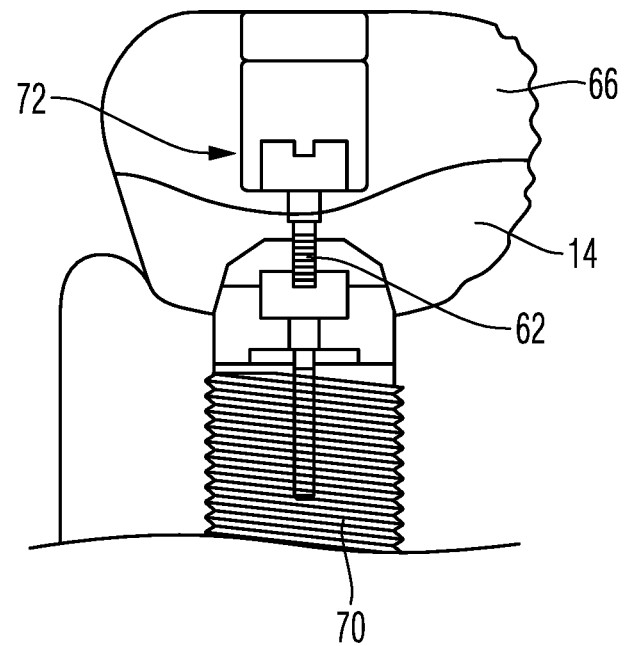
FIG. 6 shows a schematic cross-sectional view in the oral/vestibular direction through a part of another embodiment of a dental prosthesis produced in accordance with the invention.

FIG. 6 shows a schematic cross-sectional view through such a solution. A screw head 72 of the screw 60 lies on the tooth quadrant 66 in a manner which is known per se.

In one or more embodiments, the present disclosure can be embodied as a system with a control device, embodied as a system that includes a processor, a memory, and a communications interface, such as in the form of a desktop computer, smartphone, tablet, laptop computer, personal digital assistant, or other computing device. The processor provides processing functionality for the control device and can include any number of processors, micro-controllers, Programmable Logic Controller (PLC), a Proportional-Integral-Derivative (PID) controller, and so forth or other processing systems, and resident or external memory for storing data and other information accessed or generated by the control device. The processor can execute one or more software programs that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The memory is an example of tangible, computer-readable storage medium that provides storage functionality to store various data associated with operation of the control device, such as software programs and/or code segments, or other data to instruct the processor, and possibly other components of the control device, to perform the functionality described herein.

Thus, the memory can store data, such as a program of instructions for operating the system (including its components), and so forth. In embodiments of the disclosure, the memory can be integral with the processor, can comprise stand-alone memory, or can be a combination of both.

The memory can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the cable and/or the memory can include removable integrated circuit card (ICC) memory, such as memory provided by a subscriber identity module (SIM) card, a universal subscriber identity module (USIM) card, a universal integrated circuit card (UICC), and so on.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A method for producing a dental prosthesis from a blank using a CAD/CAM device, wherein the blank comprises a base material and a tooth material having a boundary surface between the base material and the tooth material, which boundary surface is formed as a wave having wave crests and wave valleys which alternate with each other along an outer periphery of the blank, wherein a peak of each wave crest extends substantially radially with respect to the blank, comprising
    determining a position of a retainer, which retainer serves to fasten the prosthesis to an alveolar crest of a patient in such a way that it passes through the boundary surface, wherein the position is determined by the CAD/CAM device,
    wherein the CAD/CAM device uses a minimum wall thickness of the prosthesis around the retainer as a parameter for determining the position of the retainer in the prosthesis, and
    fastening the retainer by gluing, screwing or incorporation by polymerisation.

2. The method as claimed in claim 1,
    wherein the retainer comprises an external telescope fitting or an overlay or covering of a bar or of an abutment in the prosthesis.

3. The method as claimed in claim 1, using a CAD/CAM device, comprising
    wherein the CAD/CAM device uses the sum total wall thickness of the base material and tooth material as a measure for the wall thickness.

* * * * *